Aug. 24, 1965  R. NEUSCHOTZ  3,201,809
FORMATION OF ELEMENTS HAVING THREADS WITH RECESSED SIDES
Filed Aug. 10, 1962  2 Sheets-Sheet 2
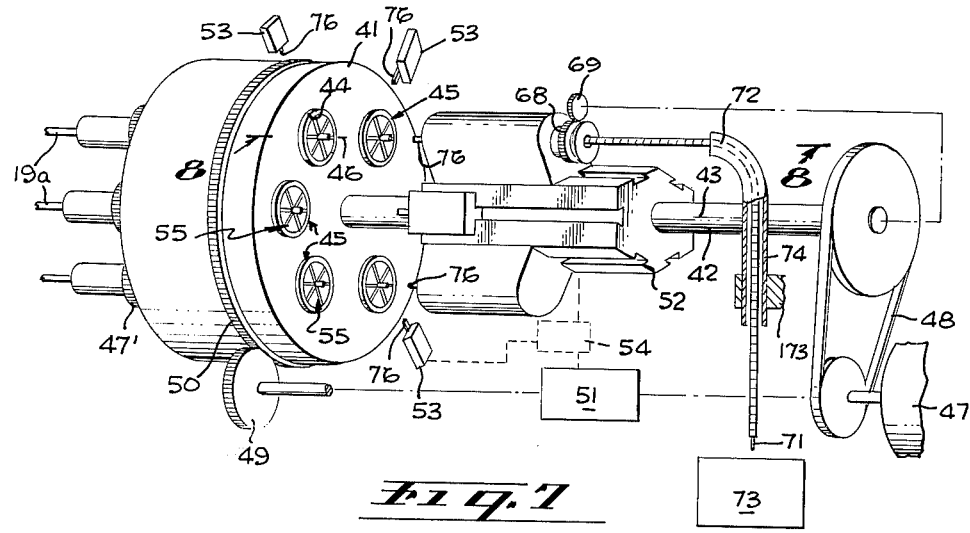
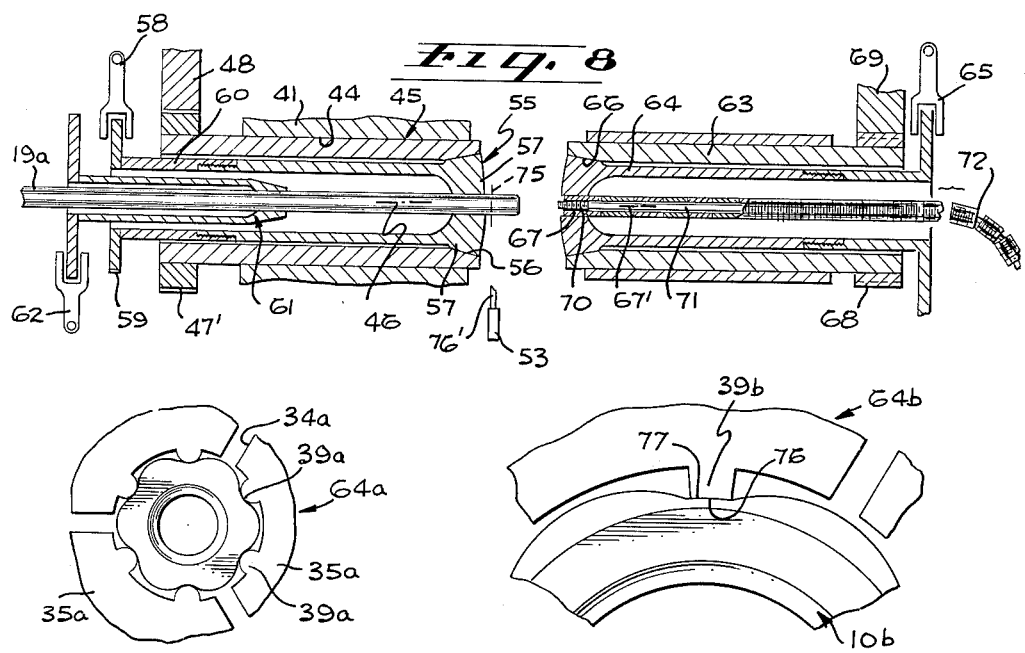
INVENTOR.
ROBERT NEUSCHOTZ
BY
William P. Green
ATTORNEY

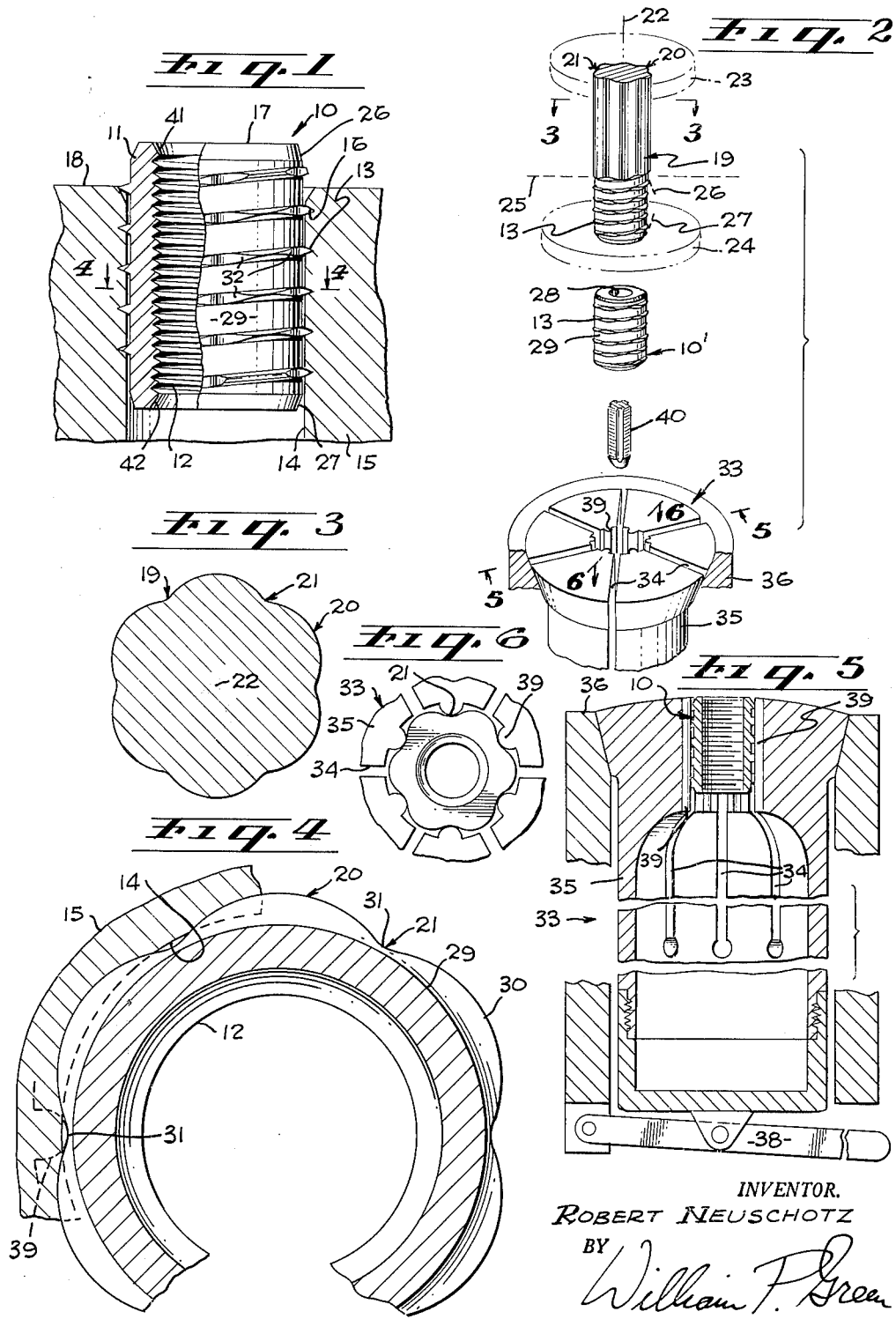

United States Patent Office 3,201,809
Patented Aug. 24, 1965

3,201,809
FORMATION OF ELEMENTS HAVING THREADS WITH RECESSED SIDES
Robert Neuschotz, 1162 Angelo Drive, Beverly Hills, Calif.
Filed Aug. 10, 1962, Ser. No. 216,080
4 Claims. (Cl. 10—10)

This invention relates to improved methods and apparatus for manufacturing threaded elements of the type disclosed and claimed in my copending application Serial Number 214,936, filed August 6, 1962, on "Threaded Elements With Self-Tapping Peaks and Recesses," and now abandoned. Certain aspects of the present methods are covered broadly in my copending application Serial Number 25,169, filed April 11, 1960, on "Method of Forming a Self-Tapping Threaded Element," now U.S. Patent No. 3,159,842 issued December 1, 1964.

The first of the two above identified copending applications discloses a unique type of self-tapping and self-locking threaded element, adapted to be screwed into an initially unthreaded bore in a carrier part, and having external threads which form mating internal threads in the carrier part as the device is screwed into the bore, and which then automatically form an interlock with the carrier part restraining the element against subsequent unscrewing rotation. This self-tapping and self-locking action is attained by forming the element from a piece of bar stock having an initial non-circular configuration, and externally threading that bar stock so that its non-circular cross-section gives to the threads a distinctive alternately peaked and recessed configuration. In use, the circular spaced peaks thus formed on the threads act to tap the mating threads in a carrier part by a very effective thread rolling type of action, and also function as the desired locking elements for engaging the carrier part in a manner restraining unscrewing rotation after installation of the threaded element within the part. In most instances, the threaded element is an insert, which is both internally and externally threaded, to form a connection between the carrier part and a stud or bolt to be screwed into the insert.

In making an element of the above discussed type, it is desirable that the external threads be formed first on the element, and that the internal threads be tapped into the part subsequently. However, during the tapping of the internal threads into the insert, it has proven very difficult to avoid damage to the self-tapping peak areas of the external threads. This is true because, during tapping of the internal threads, it is desirable that the threaded element be clamped within and rigidly held by a collet, chuck, or other gripping unit, so that this gripping unit and an associated tap may then be rotated relative to one another to tap the internal threads within the element. When the element is held by the gripping unit, the gripping action tends to deform the peaks of the external threads, and even more important, tends to displace or distort burrs which may have been formed in forming the external threads, with the result that, after the internal tapping action is completed, the external threads are so damaged or altered as to seriously adversely affect, and in many cases substantially destroy, their capacity for automatically locking the element within a carrier part.

A major object of the present invention is to provide a method and apparatus which will overcome the above discussed problem, and which will enable effective gripping of such an element during an internal tapping or other operation without damage to the self-tapping peaks of the external threads. As will appear, this result is achieved by the use of a collet or other gripping unit which is specially constructed to exert its gripping force only in the recessed portions of the external threads, and not at the critical peak areas. When the element is ultimately screwed into a carrier part, the deepest portions of the recesses in the external threads are in most instances spaced inwardly of the material of the carrier part, and do not usually engage that part. Consequently, any deformation or damage caused to the threaded element at the recessed locations will not affect the self-tapping and self-locking action of the element. In actual tests, this novel gripping method has proven of very great importance in attaining optimum self-tapping and self-locking characteristics.

The above and other features and objects of the invention will be better understood from the following detailed description of the typical embodiments illustrated in the accompanying drawings in which:

FIG. 1 is a partially elevational and partially sectional view representing a threaded insert constructed in accordance with the invention, and shown partially installed within a carrier part;

FIG. 2 is a somewhat diagrammatic representation of the method of forming the FIG. 1 element;

FIG. 3 is a transverse section taken on line 3—3 of FIG. 2;

FIG. 4 is an enlarged transverse section through the ultimate insert taken on line 4—4 of FIG. 1;

FIG. 5 is a section taken on line 5—5 of FIG. 2;

FIG. 6 is a fragmentary plan view taken on line 6—6 of FIG. 2;

FIG. 7 is a somewhat diagrammatic representation of a conventional multiple spindle screw machine as it appears when set up to automatically perform the method of FIG. 2;

FIG. 8 is an enlarged axial section through one of the main spindles and the opposed internal threading spindle of the FIG. 7 screw machine, FIG. 8 being taken on line 8—8 of FIG. 7; and FIGS. 9 and 10 are views similar to FIG. 6, but showing two variational types of collets which may be employed.

Referring first to FIGS. 1 and 4, I have shown in these figures a threaded insert of the type which is formed by the methods and apparatus of the present invention. This insert is represented generally at 10, and includes an essentially tubular body 11, normally formed of steel or other metal, and having internal threads 12 and external threads 13. The insert is adapted to be screwed into an initially unthreaded bore 14 within a carrier part 15, to tap mating threads 16 within the bore and form an effective interlock therewith. The insert may ultimately be screwed into bore 14 to a position in which the axially outer end surface 17 of the insert is approximately flush with outer surface 18 of the carrier part.

In the method of the present invention, a series of the inserts 10 are formed from successive portions of an extended piece of bar stock of the type represented at 19 in FIG. 2. This stock is of initially non-circular cross section, as is brought out in the sectional view FIG. 3, with the outer surface of the stock forming alternate peaks 20 and recesses 21 of the illustrated shape. The peaks 20 may all be identical and spaced uniformly about main axis 22 of the bar stock, and similarly the inter-peak recesses 21 may be identical and spaced uniformly about the axis. Also, it is preferred that the peaks have the illustrated smoothly rounded shape, and in the particular insert illustrated in FIGS. 1 and 4, the recesses 21 may be rounded concavely but at a substantially smaller radius of curvature than peaks 20. It is presently thought desirable that six peaks be provided on the material, though it is contemplated broadly that the invention may be applied to cross sections having different numbers of peaks. The cross section of FIG. 3 may continue uniformly and without alteration along the entire length of the extended bar stock 19. This cross section may be given to the bar initially by drawing the bar through an appropriately shaped drawing die diagrammatically represented at 23 in FIG. 2.

In forming a series of the inserts 10 from successive portions of bar stock 19, these successive portions are sequentially externally threaded, typically by means of a conventional threading die 24, and specifically by either rotating the work piece 19 or die 24 to screw the die onto the end portion of the stock. In this way, external threads 13 are cut on the end of the bar stock, to a plane such as that represented at 25 in FIG. 2, following which the threaded end portion of the stock is cut off at plane 25 to a proper length for forming one insert. Before the threading operation, the opposite ends of the area to be threaded may be chamfered at 26 and 27, so that the threads after formation will be correspondingly chamfered. Also, it is preferred that a bore 28 be drilled through the end portion of the bar stock before it is cut off at plane 25.

The chaser 24 or other tool which forms external threads 13 is desirably so shaped as to form on the insert an axially extending minor diameter surface 29 between successive turns of the external thread. As will be apparent from FIG. 4, the non-circular cross sectional shape of the initial bar stock causes the external threads 13 to be truncated progressively in advancing from the maximum diameter point 30 on one of the peaks 20 to the minimum diameter point 31 of one of the recesses, and to progressively increase in radial thickness in advancing to the next successive maximum diameter peak location 30. Thus, only small portions of the initial outer surface of bar stock 19 remain, to form the surfaces 32 of FIGS. 1 and 4, defining peaks and recesses 20 and 21 on the ultimate insert corresponding to the peaks and recesses 20 and 21 of the bar stock. It is noted that surfaces 32 progressively widen as they advance radially inwardly, and that minor diameter surface 29 of the external threads, in the optimum arrangement, is for best results located slightly radially inwardly of the inner most minimum diameter points 31 of recesses 20.

After the external threads have been completely formed, and the threaded end portion of the bar stock has been cut off, the resulting part is placed in a gripping unit such as the collet represented at 33 in FIG. 2, and is held by that collet during the formation of internal threads 12 in the device. This collet may be an essentially tubular part formed of resilient metal, with the end of the part containing six uniformly spaced axially extending slots 34 forming gripping fingers 35 between the slots. The fingers are actuable radially inwardly against an internally unthreaded one of the insert elements 10', by means of a camming ring 36, relative to which the collet may be displaceable downwardly in any suitable manner, as by means of a lever 38. The fingers 35 are normally urged by their own resilience radially outwardly to positions in which they release element 10', but are actuable inwardly to gripping positions by means of lever 38.

FIG. 6 represents the cross sectional configuration of the fingers 35 of the collet, which fingers have lugs or projections 39 shaped to extend into recesses 21 of threads 13, and engage the threads only at the radially innermost or deepest portions 31 of the recesses. Lugs 39 may be of uniform transverse section throughout an extended length corresponding to several turns of the threads 13, and preferably of a length substantially as great as that of the ultimate insert. As will be apparent from FIG. 6, this cross section may be such as to form rounded inner tips on the lugs, curving at a radius which is somewhat smaller than the radius of curvature of recesses 21, to assure engagement with the recesses at only their deepest points. The portions of fingers 35 circularly between lugs 39 are spaced outwardly far enough to assure against any contact of those portions with the peaks 20.

After the externally threaded element has been gripped tightly by collet 33, internal threads 12 are formed within the element by either rotating the collet or the tap 40 illustrated in FIG. 2, and of course axially advancing one of the parts relative to the other during such rotation. When the internal tapping has been finished, the final insert may be removed from collet 33. Prior to the internal threading operation, the ends of the inner bore within the insert may be chamfered if desired, as indicated at 41 and 42 in FIG. 1.

It is of course possible to perform all of the method steps described above in connection with FIG. 2 by hand. However, it is preferred that the production of the insert be mechanized, and specifically, it is desirable in most instances that the various operations be performed automatically and in rapid succession on a screw machine or other similar automatic machine. FIGS. 7 and 8 illustrate the manner in which a multiple spindle screw machine may be adapted for such manufacture of the present inserts. This screw machine is in most respects completely conventional, except with regard to the manner in which the bar stock and inserts are gripped by the machine, and consequently the mechanism of the machine has at some points been represented only diagrammatically, and only in such detail as is necessary to bring out the novelty of the invention.

In FIG. 7, I have represented at 41 the spindle carrying member of an automatic screw machine, which member is mounted about, and turns about a main shaft 42, centered about an axis 43. Body 41 contains a series of passages or bores 44 within which as many spindles 45 are mounted for rotation about individual axes 46 disposed parallel to main axis 43. The spindles 45 are continuously driven about their individual axes, this power actuation being typically represented as being effected by a series of individual gears 47' carried by the different spindles, and engaging a common drive gear 48 (FIG. 8) carried by and turning with main shaft 42. The main shaft is represented as being continuously driven by a motor 47 through a chain or other timed drive mechanism 48.

Member 41 is turned rotatively in timed relation to the operation of the rest of the mechanism to successively advance the different spindles to a series of different circularly spaced positions at which different operations are performed on the work material. FIG. 7 typically illustrates an arrangement in which such rotary advancement of part 41 and its carried spindles 45 is effected by a gear 49 engaging a ring gear 50 disposed about member 41, with gear 49 being intermittently actuated in proper timed sequence by means of a transmission represented at 51 and driven by motor 47.

The various working tools are carried by the usual axially moveable carriage 52, and one or more conventional cross slides 53, all actuated in timed relation to the rest of the mechanism by drive apparatus typically designated 54 in FIG. 7.

Each of the spindles 45 contains and rotatively drives a collet 55 which may be the same as that shown at 33 in FIGS. 5 and 6. Collets 55 grip individual parallel lengths of non-circular bar stock 19a corresponding to that shown at 19 in FIG. 2, with a short end portion of the stock projecting beyond the collet for external threading and other machining operations. The spindle 45 has a cam surface 56 which tightens the lugs of the different fingers 57 of collet 55 inwardly against the bar stock at the recessed locations upon leftward movement of collet 55 as viewed in FIG. 8. The collet is actuated to the left automatically in timed relation to the operation of the rest of the mechanism, by an actuating mechanism typically represented as a lever 58 acting against a flange 59 formed on the left end of part 60 to which the collet is attached. Similarly, a second and inner collet 61, preferably having gripping lugs corresponding to lugs 39 of collets 33 and 55, is actuable by a suitable conventional constricting ring (not shown), to grip the stock within recesses 21, and to then shift the stock to the right at appropriate intervals, under the influence of an actuating mechanism represented at 62, to thereby feed successive portions of the stock to the machining location.

Axially opposite one of the various successive positions (typically six positions) of spindles 45, the carriage 52 carries another spindle 63, which contains a collet 64 identical with collets 55 and 33. Collet 64 is actuable to the right, relative to carriage 52, by a timed actuating mechanism typically represented at 65, so that cam surfaces 66 may function to tighten the collet against one of the inserts 67 as the insert is being cut off of the bar stock from which it is formed. Spindle 63 and its carried collet 64 are driven rotatively about axis 67' in unison with the other collets 55, by means of a drive mechanism typically represented as including a gear 68 timed to rotate in unison with gears 47 through the train of gears indicated at 69 and 48. Spindle 63 is of course moved axially with carriage 52 when the latter is actuated. The internal threads within the inserts are formed by a tap 70 which is formed at the end of an elongated rod 71 which extends axially along axis 67 through the entire spindle 63, and then turns downwardly at 72 to deposit the ultimate inserts within a container 73. The rod or wire 71 is rigid, and is mounted in essentially fixed relation to the frame 173 of the tool, as by reception within a guide tube 74 turned downwardly in correspondence with the bend formed at 72 in the tapping rod. Sufficient space is provided radially between tube 74 and rod 72 to allow a series of the formed inserts to pass through the tube and about rod 72 toward ultimate container 73.

To now describe a cycle of operation of the apparatus of FIGS. 7 and 8, assume first of all that six different non-circular bars or rods are received within the six spindles 45, and that the motor is energized to continuously drive the spindles about their individual axes, and to successively advance the spindles about main axis 43 through their six different settings. The cycle may be considered as commencing when one of the spindles and its carried work piece is in the position of the particular spindle 45 illustrated in FIG. 8. It may be assumed that a completed insert has just been cut off of the end of bar stock 19a, typically in the plane illustrated at 75 in FIG. 8. Starting from this point, the mechanism first releases the collet 55 of FIG. 8, and then actuates inner collet 61 to the right far enough to advance the next successive end portion of the bar stock 19a to an outwardly projecting position. Collet 55 then again grips the work piece and holds it tightly, within the recesses 21 in the same manner illustrated in FIG. 6, and the collet continues to grip the work piece in this manner while the collet and stock continuously rotate about their individual axis, and as the collet subsequently advances through its different positions about axis 43. When the collet is at each of the different circularly successive locations, carriage 52 moves to the left, and the cross slides 53 are actuated through predetermined cycles, to perform a series of desired machining operations on the outwardly projecting portion of the non-circular stock. Specifically, the different cutting tools represented somewhat diagrammatically at 76, and carried by the carriage 52 and cross slides 53, act to form chamfers 26 and 27 on the work piece, drill a bore through the center of the work piece, actuate a chaser assembly to form external threads 13, and if desired to form one counter sink 41 in the exposed end of the work piece. Thus, by the time the work piece has revolved entirely about axis 43 to the initial position of FIG. 8, the external formation of one of the inserts is complete, and it is ready to cut off. As carriage 52 moves to the left with its contained collet 64 in opened or released condition, the collet moves to a position in which the externally threaded end portion of bar stock 19a is received in collet 64, at which time the collet is actuated to grip the work piece in the condition illustrated in FIG. 6 (contacting only the deepest portions of the recesses in the work piece threads). A cutting tool such as that represented at 76', and typically carried by one of the cross slides 53, then moves into position to cut off the insert at plane 75. During this entire operation, both of the spindles 45 and 63, and their contained collets, are of course continuously rotating in unison. Collet 64 and spindle 63 are then retracted to the right with carriage 52, and while still rotating, to move past the location of the tapping end 70 of rod 71, and at a rate timed with respect to the rate of rotation to properly tap the internal threads 12 within the insert. When the insert has moved beyond tapping portion 70, collet 64 is released to enable it to return to the left for the next successive operation, while leaving the insert which has just been formed on rod 71. Thus, each insert as it is tapped forces the preceding completed inserts to the right along rod 71 and toward receptacle 73. The second counter sink 41 or 42 in the insert may be formed by an appropriate cutting tool while the insert is held by collet 64.

Since the collet 64 is of the cross section illustrated in FIG. 6, and grips the external threads of the insert at only their radially inner most recessed areas, there is no possibility of damaging the peaks 30 or distorting any burrs which may be formed on the peaks. With reference to FIG. 4, it is noted that the inner surface 14 of the bore within carrier part 15 preferably has a diameter which is substantially greater than the diameter of the inwardly recessed area 31, so that the material of carrier part 15 does not contact the recessed area which is engaged by the gripping collet during manufacture. It is further noted that, since the collets 55 in the main turret of the apparatus are of the same configuration as is collet 64, the bar stock itself is gripped only at the recessed locations, and any possibility of damaging the item in this condition is avoided.

In a variational process embodying the invention, the bar stock 19 may be externally threaded by an appropriate chaser assembly before insertion of the bar stock into position within the main collets 55 of the turret. The cutting tools may then serve merely to perform the chamfering, drilling, cut off, and internal tapping operations, on the equipment of FIGS. 7 and 8. In this arrangement it becomes even more important that the collets 55 be of the FIG. 6 configuration, to grip only the recessed areas, since the stock has already been externally threaded at the time that it is held in collets 55 (as is true of collets 61 also).

FIG. 9 is a view similar to FIG. 6, but showing a variational arrangement in which collet 64a, to be used at location 64 and also locations 55 in FIGS. 7 and 8, has only three spaced slits 34a, defining there between three spaced fingers 35a, with each finger having two appropriately located gripping lugs 39a for reception in two different recesses in the insert.

FIG. 10 shows another form of collet 64b which may be used at each of the different collet locations, and which is identical with that of FIG. 6 except that the inner surfaces 76 of lugs 39b are curved cylindrically and identically about the main axis of the collet, to engage and grip correspondingly cylindrically curved minimum radius inwardly recessed surfaces 77 formed at the depths of the recesses within the external threads of insert 10b.

A further variational form of collet may be the same as that of FIG. 9, but with only three of the lugs 39a being provided, one on each finger 25a, to engage only alternate ones of the recessed areas in the insert.

I claim:

1. The method of forming a threaded element comprising starting with an elongated piece of stock having a predetermined non-circular external cross section throughout an extended length thereof, said cross section being such that the non-circular stock presents a series of circularly successive sides extending along the length of the stock and forming radially outwardly projecting peaks at the junctures of said sides also extending along the length of the stock, forming external threads on said non-circular stock with the threads being truncated progressively by said sides so that said sides form outer surfaces on the threads which, as a particular thread extends circularly from one peak to the next, first decrease in radius to a predetermined recessed portion and then increase in radius toward the next peak, individual ones of said recessed portions of said outer surfaces being recessed radially inwardly beyond a plane which is drawn to just touch the two adjacent peaks, holding said stock, after forming said external threads, by gripping the stock at essentially the radially innermost portions of certain of said recessed portions but not at said peaks, internally threading said stock while thus held, and at some time during said method cutting off successive portions of said non-circular stock to form a series of threaded elements from successive portions thereof.

2. The method of forming a threaded element comprising starting with an elongated piece of stock having a predetermined non-circular external cross section throughout an extended length thereof, said cross section being such that the non-circular stock presents a series of circularly successive sides extending along the length of the stock and forming radially outwardly projecting peaks at the junctures of said sides also extending along the length of the stock, forming external threads on said non-circular stock with the threads being truncated progressively by said sides so that said sides form outer surfaces on the threads which, as a particular thread extends circularly from one peak to the next, first decrease in radius to a predetermined recessed portion and then increase in radial thickness toward the next peak, individual ones of said recessed portions of said outer surfaces being recessed radially inwardly beyond a plane which is drawn to just touch the two adajacent peaks, holding said stock, after forming said external threads, by gripping the stock at essentially the radially innermost portions of certain of said recessed portions but not at said peaks, performing an operation on said stock, while thus held, and at some time during said method cutting off successive portions of said non-circular stock to form a series of threaded elements from successive portions thereof.

3. The method of forming a threaded insert comprising starting with an elongated piece of stock having a predetermined non-circular external cross section throughout an extended length thereof; said cross section being such that the non-circular stock presents a series of circularly successive sides which extend along the length of the stock and form radially outwardly projecting peaks at the junctures of said sides, and circularly intermediate recesses, also extending along the length of the stock; cutting external threads on said non-circular stock, with a cutter which may form burrs on the threads, and with the threads being truncated progressively by said sides, circularly between said peaks, so that said sides form outer surfaces on the threads which have radially outermost portions at the outer extremities of said peaks, radially innermost portions at the inner depths of said recesses, and portions of progressively changing radius circularly between said innermost and outermost portions; individual ones of said innermost portions of said outer surfaces being recessed radially inwardly beyond a plane which is drawn to just touch the two adjacent peaks; holding said stock, after cutting said external threads, by gripping the stock at essentially only said radially innermost portions of said outer surfaces; avoiding contact with said outermost portions of said outer surfaces, and avoiding substantial contact with said portions of changing radius circularly between the outermost and innermost portions, while gripping said innermost portions, to thereby avoid deforming any burrs which may have been formed by the thread cutting operation at the locations of said outermost portions and portions of changing radius; forming internal threads in said stock while it is thus held; and at some time during said method cutting off successive portions of said non-circular stock to form a series of threaded inserts from successive portion thereof.

4. The method of forming a threaded insert as recited in claim 3, including holding said stock during the formation of said external threads on a part of the stock, by gripping another part of the stock, which has not as yet been threaded, at essentially only the locations of the radially innermost portions of said recesses, but not circularly between said innermost portions.

References Cited by the Examiner

UNITED STATES PATENTS

| 1,577,299 | 3/26 | Rohde | 269—270 |
| 1,882,997 | 10/32 | Scott | 279—1.1 |
| 2,056,053 | 9/36 | Moore | 10—10 |
| 2,352,982 | 7/44 | Tomalis | 10—10 |
| 2,463,953 | 3/49 | Curtis | 10—86 |
| 2,704,848 | 3/55 | Straty | 10—107 |
| 2,823,574 | 2/58 | Rosan | 85—47 |

ANDREW R. JUHASZ, *Primary Examiner.*